(12) United States Patent
Jiandong et al.

(10) Patent No.: US 10,836,620 B2
(45) Date of Patent: Nov. 17, 2020

(54) REMOVABLE PLUG-IN MODULES FOR MATERIAL HANDLING VEHICLES

(71) Applicant: Big Lift, LLC, Lombard, IL (US)

(72) Inventors: Yu Jiandong, Hangzhou (CN); Lin Zuqian, Hangzhou (CN); Xu Minghui, Hangzhou (CN); Huang Chao, Hangzhou (CN); Ma Qichen, Hangzhou (CN)

(73) Assignee: ZHEJIANG E-P EQUIPMENT CO., LTD. (CN)

( * ) Notice: Subject to any disclaimer, the term of this patent is extended or adjusted under 35 U.S.C. 154(b) by 91 days.

(21) Appl. No.: 16/386,423

(22) Filed: Apr. 17, 2019

(65) Prior Publication Data

US 2020/0331733 A1 Oct. 22, 2020

(51) Int. Cl.
*B66F 9/075* (2006.01)
*B62D 1/14* (2006.01)

(52) U.S. Cl.
CPC ............ *B66F 9/07568* (2013.01); *B62D 1/14* (2013.01); *B66F 9/0754* (2013.01)

(58) Field of Classification Search
CPC ........ B62D 1/14; B62D 51/00; B62D 51/001; B66F 9/07568; B62B 5/063
USPC ........................................................ 180/332
See application file for complete search history.

(56) References Cited

U.S. PATENT DOCUMENTS

| | | | |
|---|---|---|---|
| 4,756,978 A | 7/1988 | Nitcher et al. | |
| 7,198,132 B2 * | 4/2007 | Gerbier | B62B 5/06 180/333 |
| 7,325,655 B2 * | 2/2008 | Lohmann | B62D 1/14 180/315 |
| 8,412,431 B2 | 4/2013 | Wetterer et al. | |
| 8,413,947 B2 | 4/2013 | Chiang | |
| 8,467,937 B2 * | 6/2013 | Hanna | B62B 5/063 701/41 |
| 9,421,963 B2 | 8/2016 | Wetterer et al. | |
| 9,586,605 B2 * | 3/2017 | He | B62B 3/0612 |
| 9,718,661 B1 | 8/2017 | Hoffman | |
| D801,616 S | 10/2017 | Qichen et al. | |
| 9,908,762 B1 | 3/2018 | Hongpeng et al. | |
| 9,966,712 B1 | 5/2018 | Hongpeng et al. | |
| 10,173,709 B2 * | 1/2019 | Zheng | B62B 5/067 |
| 10,538,422 B2 * | 1/2020 | Lijian | H05K 5/0008 |
| 10,730,728 B1 * | 8/2020 | Qichen | B66F 9/07504 |
| 2007/0137904 A1 | 6/2007 | Rose et al. | |

(Continued)

*Primary Examiner* — Laura Freedman (74) *Attorney, Agent, or Firm* — Cook Alex Ltd.

(57) ABSTRACT

A handle and tiller head plug-in module for a material handling vehicle. The handle having an elongated tiller having an upper portion including at least one steering handgrip member and an upward extending wall surrounding electrical contacts associated with operator control functions. The tiller head plug-in module includes a housing having a downward extending wall surrounding electrical contacts, with the housing supporting a plurality of operator control interface elements, including at least one lift control element, and at least drive control element. The tiller head plug-in module is configured to be removably electrically connected to the handle when the upward extending wall surrounding the electrical contacts of the upper portion of the tiller is plugged into and received by the downward extending wall surrounding the electrical contacts of the housing.

16 Claims, 12 Drawing Sheets

(56) References Cited

U.S. PATENT DOCUMENTS

| | | |
|---|---|---|
| 2010/0025126 A1 | 2/2010 | Nakatsu et al. |
| 2014/0195127 A1 | 7/2014 | Hoffman |
| 2015/0102274 A1 | 4/2015 | He et al. |
| 2015/0266543 A1 | 9/2015 | Marioni |
| 2017/0267506 A1* | 9/2017 | Frei .................... B66F 9/07568 |
| 2018/0009643 A1 | 1/2018 | Hoffman |
| 2019/0322507 A1* | 10/2019 | Jiandong ............... B62B 3/0612 |
| 2019/0322508 A1* | 10/2019 | Lili ........................ B66F 9/065 |
| 2019/0322509 A1 | 10/2019 | Jianming et al. |

* cited by examiner

REMOVABLE PLUG-IN MODULES FOR MATERIAL HANDLING VEHICLES

TECHNICAL FIELD

The invention relates to material handling vehicles, such as pallet trucks, stackers, forklifts and the like. More particularly, the disclosure provides removable plug-in modules including a tiller head module, a controller module and a battery module for such vehicles. The plug-in modules may be used individually or in any combination thereof for quick and convenient replacement in the event of a respective module malfunction, discharge or failure.

BACKGROUND

Material handling vehicles are widely used in and around warehouses, manufacturing facilities, stores and the like. Vehicle downtime can be particularly detrimental to efficiency and productivity. Material handling vehicles may need to be removed from service due to various circumstances, such as malfunctioning tiller head operator controls, a faulty vehicle controller or a discharged or defective battery.

In prior art material handling vehicles, whether electric or gas powered, it is common to have tiller head operator controls, vehicle controllers and batteries fixedly mounted to the vehicles in a manner that requires taking the vehicles out of service to undergo time consuming disassembly and repair. For example, when a standard battery in a prior art vehicle is discharged or defective, the vehicle must be shut down and taken out of service. It can take significant time to undergo charging and to achieve a fully charged battery, or to remove body panels or covers that encase the battery within the vehicle, and to dismount, disconnect the cables or wiring and remove the standard battery. Then, the process must be reversed to install the recharged battery or a replacement battery. Even in the case of a vehicle having a connector that can be used for recharging a battery that remains connected to the vehicle, whether via connection to an onboard charger or a separate charger, while the battery itself would not need to be removed to recharge during a common downtime, such as overnight, the vehicle still must be taken out of service to recharge the battery. Thus, if a battery is discharged during a work shift, the vehicle must be sidelined.

Issues can arise with respect to operator controls in a tiller head or with respect to a vehicle controller, which similarly would require significant disruption of use of the material handling vehicle. The vehicle would need to be taken out of service for what may be very time consuming disassembly of a tiller head of a handle or removal of body panels to access, disconnect and remove a controller for service or maintenance operations. This may result in a significant reduction in productivity, due to the vehicle downtime needed to repair the vehicle and put it back in service.

SUMMARY

The subject matter of this disclosure provides advantageous tiller head, controller and battery plug-in modules, rather than the traditional fixedly mounted and hard wired devices found on typical prior art material handling vehicles, such as pallet trucks, stackers, forklifts and the like. The prior art vehicle systems having fixedly mounted and concealed devices may require significant disassembly of the vehicle and the mounting assemblies and potential disassembly of wiring connections and the like. In contrast, the present disclosure provides an example handle and tiller head plug-in module, an example vehicle body and controller plug-in module, and an example vehicle body and battery plug-in module that may be used individually or in any combination to permit an operator to very quickly and easily remove and replace an affected module, without having to take the vehicle off-line and transport it to another location for maintenance. Indeed, a typical party that utilizes material handling vehicles may provide vehicle operators access to replacement tiller head, controller and battery plug-in modules that may be quickly and conveniently used to keep one or more vehicles in service. The vehicles may be configured to have the plug-in modules exposed from the exterior of the vehicle, permitting the modules to be grasped and removed without having to use tools to remove body panels or to disconnect wires that may be required with typical prior art tiller head, controller or battery devices. If desired, optional fasteners may be used to more securely connect the modules, such as to ensure that vibration will not loosen a connection.

It may be particularly helpful, for example, for operators of material handling vehicles to have access to one or more spare tiller head, controller and/or battery plug-in modules, and to use the same to minimize vehicle downtime. For example, there may be a malfunction of the operator controls, such as a faulty or inoperative control button, rocker or toggle switch, dial, rotatable control element or other interface element located on a tiller head of a pallet truck handle. In such case, rather than having to remove the vehicle from service to disassemble the tiller head from the tiller of the handle assembly, and to further diagnose and take action to order, replace or repair some part of the tiller head, and then to reassemble everything, an operator instead may quickly and conveniently simultaneously unplug and remove a tiller head plug-in module, and plug-in a spare module, thereby keeping the vehicle in service. The faulty or inoperative tiller head plug-in module then may be diagnosed and serviced separately, without disrupting use of the vehicle.

Similarly, if a vehicle controller plug-in module is faulty, an operator may simply grasp and unplug the controller module from the vehicle, grasp and plug-in a spare controller plug-in module, and continue using the vehicle. The removed controller then may be dealt with separately, while the vehicle remains in service, permitting the highest possible level of productivity.

If a battery plug-in module were to be discharged or malfunction, an operator could quickly and conveniently unplug and remove the battery module by simply lifting it away from the vehicle. The battery plug-in module could then be connected to a battery charger or otherwise serviced, while the operator grabs a spare fully-charged battery plug-in module to be quickly plugged into the vehicle to stay in service. This provides enhanced efficiency by allowing the vehicle to immediately resume service without having to wait for an onboard battery to be recharged or for more extensive disassembly of the vehicle body panels or wiring to remove and replace the standard battery.

In a first aspect, the disclosure provides a handle and tiller head plug-in module for a material handling vehicle, including a handle having an elongated tiller having an upper portion, with the upper portion including at least one steering handgrip member and an upward extending wall surrounding electrical contacts associated with operator control functions of the material handling vehicle. Further included is a tiller head plug-in module including a housing having a downward extending wall surrounding electrical contacts and supporting a plurality of operator control interface elements, including at least one lift control element, and at least one drive control element. The tiller head plug-in module is configured to be removably electrically connected to the handle when the upward extending wall surrounding the electrical contacts of the upper portion of the handle is plugged into and received by the downward extending wall surrounding the electrical contacts of the housing.

It is to be understood that both the foregoing general description and the following detailed description are exemplary and provided for purposes of explanation only, and are not restrictive with respect to the claimed subject matter. Further features and advantages will become more fully apparent in the following description of the example preferred embodiments and from the appended claims.

BRIEF DESCRIPTION OF THE DRAWINGS

In describing the example embodiments, references are made to the accompanying drawing figures wherein like parts have like reference numerals.

It should be understood that the drawings are not necessarily to scale. While some mechanical details of material handling vehicles have been omitted, including some details of fastening or connecting means and other plan and section views of the particular components, such details are considered to be within the comprehension of those skilled in the art in light of the present disclosure. It also should be understood that the present disclosure is not limited to the examples illustrated and described.

DETAILED DESCRIPTION OF THE PREFERRED EMBODIMENT

This disclosure provides solutions to the technical problems presented by tiller head, controller and battery systems of battery operated material handling vehicles, such as are used in powered pallet trucks, stackers, forklifts and the like. Examples of new tiller head, controller and battery plug-in modules are described further herein in reference to a preferred embodiment of a material handling vehicle 2 shown in the accompanying drawing FIGS. 1-20. The example material handling vehicle 2 happens to be in the form of a powered pallet truck, which is shown in FIGS. 1-6. It will be appreciated, however, that the invention may be constructed and configured in various ways and is not limited to the specific example shown and described herein, and its use with material handling vehicles is not limited to pallet trucks.

The example vehicle 2 is shown with a front load lift portion 4, which includes a vehicle body 6 having an upstanding body portion 8 and forks 10 extending forward from the upstanding body portion 8. Rearward of the front load lift portion 4, the vehicle 2 also includes a base support portion 12. The base support portion 12 includes a drive wheel 14, a lift mechanism 16 that extends between the base support portion 12 and the front load lift portion 4 to move the front load lift portion 4 up and down relative to the base support portion.

The base support portion 12 also includes a steering seat 18 and extending upward from the steering seat 18 is a handle 20. The handle 20 includes an elongated tiller 22 having an upper portion 24. The upper portion 24 of the tiller 22 includes at least one steering handgrip member 26. In this example, there are two steering handgrip members 26 which initially extend outward (laterally) and away from each other and from the tiller 22, but the steering handgrip members 26 then curve upward and back toward each other, terminating in free, spaced apart distal ends 28. Left and right respective handgrips 30 are provided proximate the distal ends 28 of the steering handgrip members 26.

The upper portion 24 of the tiller 22 of the handle 20 also includes an upward extending wall 32 surrounding electrical contacts 34 associated with operator control functions of the material handling vehicle 2. This structure forms an upward extending tiller head connector 36 to be received by a tiller head plug-in module 38.

Accordingly, a tiller head plug-in module 38 is provided for connection to the upper portion 24 of the elongated tiller 22 at the tiller head connector 36. The tiller head plug-in module 38 includes a housing 40, with the housing 40 having a downward extending wall 42 surrounding electrical contacts 44, which form a downward extending tiller head plug-in module connector 46, which receives the upward extending tiller head connector 36. The housing 40 supports a plurality of operator control interface elements 48, including at least one lift control element 50, and at least one drive control element 52. The tiller head plug-in module 38 is configured to be removably electrically connected to the handle 20 when the upward extending wall 32 surrounding the electrical contacts 34 of the upper portion 24 of the tiller 22 is plugged into and received by the downward extending wall 42 surrounding the electrical contacts 44 of the housing 40.

Figure 9:
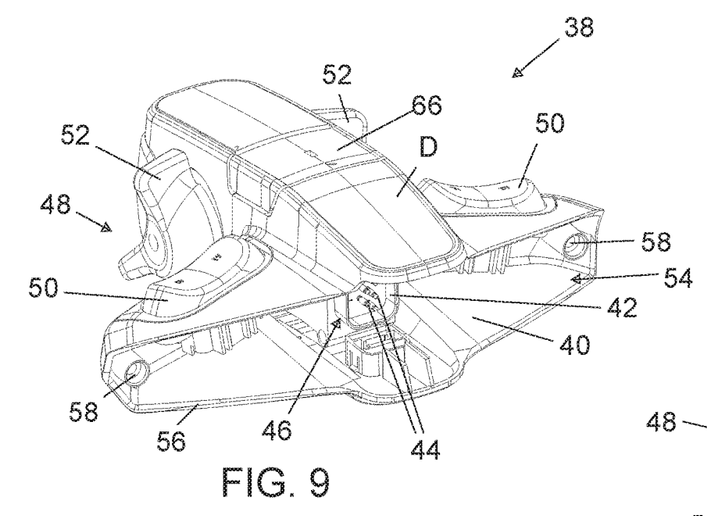
FIG. 9 is a right lower front perspective view of the tiller head plug-in module shown in FIG. 7 and in an upward facing position.
Figure 10:
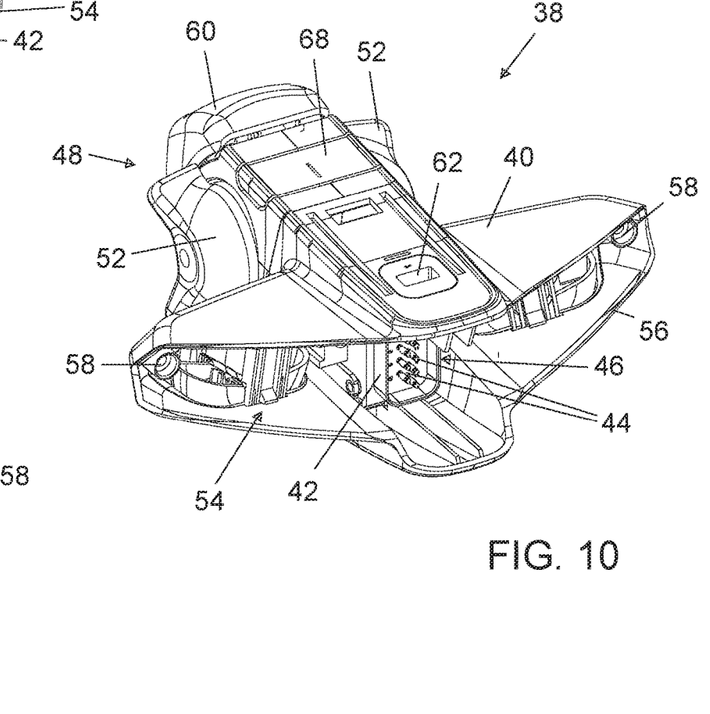
FIG. 10 is a left lower rear perspective view of the tiller head plug-in module shown in FIG. 7 and in a downward facing position.
Figure 11:
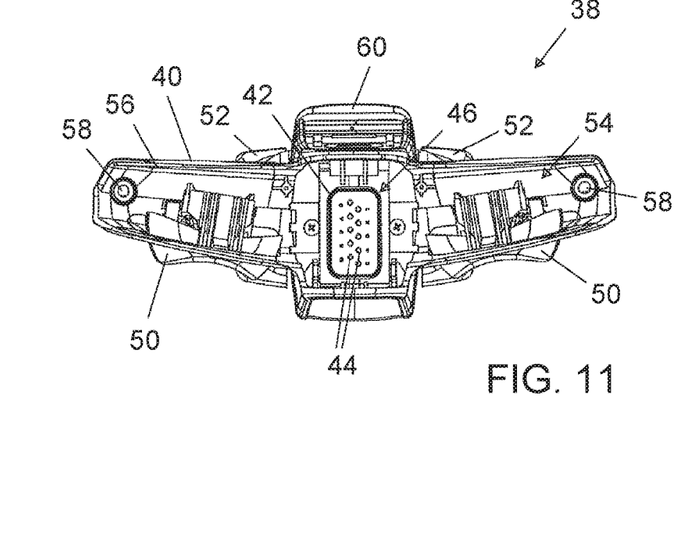
FIG. 11 is a bottom plan view of the tiller head plug-in module shown in FIG. 7.

Depending on the particular structures utilized and the installation preference, the removal and replacement of the tiller head plug-in module 38 may be quickly and conveniently accomplished by simply grasping the module 38 that is on the vehicle 2 and pulling upward for removal, and then grasping an available replacement module 38 and forcing it downward until the downward extending wall 42 surrounding the electrical contacts 44 receives the upward extending wall 32 surrounding the electrical contacts 34. The housing 40 has an open bottom 54 having a perimeter and includes a downward extending wall 56 at the perimeter of the open bottom 54. As best seen in FIGS. 9-11, the downward extending wall 42 surrounding the electrical contacts 44 is disposed within the open bottom 54 of the housing 40. The downward extending wall 56 at the perimeter of the open bottom 54 receives a portion of at least one steering handgrip member 26 when the upward extending wall 32 surrounding the electrical contacts 34 of the upper portion 24 of the tiller 22 is plugged into and received by the downward extending wall 42 surrounding the electrical contacts 44 of the housing 40. In the example shown, the downward extending wall 56 at the perimeter of the open bottom 54 of the housing actually receives a portion of both of the steering handgrip members 26. This helps to stabilize the tiller head plug-in module 38, and may provide for connection and removal without the use of tools. However, if there is a desire to establish a more robust connection, the housing 40 includes apertures 58 that are configured to receive fasteners, wherein the fasteners pass through the apertures 58 in the housing and connect the housing 58 to the tiller 22. It will be appreciated that alternative means of more securely connecting the removable tiller head plug-in module 38 to the tiller 22 may be constructed in other suitable ways, such as by use of other fasteners, tabs or catches, hook and loop fasteners or the like.

It will be appreciated that the at least one lift control element 50 may extend forward from the housing 40, as shown in FIGS. 2, 3, 7 and 8. In the present example, the at least one lift control element 50 includes a rocker switch or toggle switch. Indeed, the present example includes a plurality of such lift control elements 50, with two shown to provide for engagement by a user's right hand or left hand. Also, the lift control elements 50 of the present example happen to provide for both lifting and lowering the load lift portion 4, depending on which end of each switch is depressed, such that they may be referred to as a plurality of lift and lower control elements.

The at least one drive control element 52 of the present example extends from a side of the housing 40. The at least one drive control element 52 may be configured to control forward drive, as well as rearward drive. Indeed, the at least one drive control element 52 may be in the form of a plurality of drive control elements 52, such as are shown extending from the right and left sides of the housing 40 in FIGS. 1-3. These drive control elements 52 are pivotable or rotatable in a forward direction to control forward drive and in a rearward direction to control rearward drive of the vehicle 2. The drive control element 52 also controls the drive speed, within the limits of the vehicle, by pivoting the drive control element 52 to a greater or lesser extent for faster or slower travel.

The operator control interface elements 48 may further include additional elements associated with additional functions, such as at least one auto-direction reversing control element 60. The auto-direction reversing control element 60 provides a large button that extends from the top of the housing 40 and provides an important safety feature. If a user is moving the vehicle rearward and backs into an obstruction, the user is likely to at least inadvertently engage the auto-direction reversing control element 60 extending from the top of the tiller head plug-in module 38, which will cause the vehicle 2 to reverse its direction of travel and move forward, such that the user cannot become trapped between the vehicle 2 and the obstruction.

Another of the plurality of operator control interface elements 48 that serves a safety purpose is an operator key port 62. The operator key port 62 is located on the rear of the tiller head plug-in module 38, and may accept a magnetic or electronic operator key 64 to permit operation of the vehicle 2. Thus, the operator key 64 must be inserted into the operator key port 62 to energize the vehicle 2. It will be appreciated that the operator key 64 and operator key port 62 may require physical engagement, as opposed to magnetic or electronic engagement, to turn on the vehicle 2. The tiller head plug-in module 38 further may include such features as a horn button 66, which is on the front face, and a low speed control button 68, which is on the rear face and may be depressed when the handle 20 is in an upright, vertical position, so as to permit a very low speed operational mode. This enhances safety because an operator may need to move a vehicle 2 when the handle is fully upright, but may have greater difficulty operating the vehicle 2 with the tiller 22 of the handle 20 in such an awkward position, relative to when the tiller 22 is pivoted at the steering seat 18 to an inclined position for use. Other safety features also may be present on the vehicle 2, such as a master emergency stop button 70 that is located on the top of the body 6, for easy and fast access if there is a need to immediately halt operation of the vehicle 2.

Figure 5:
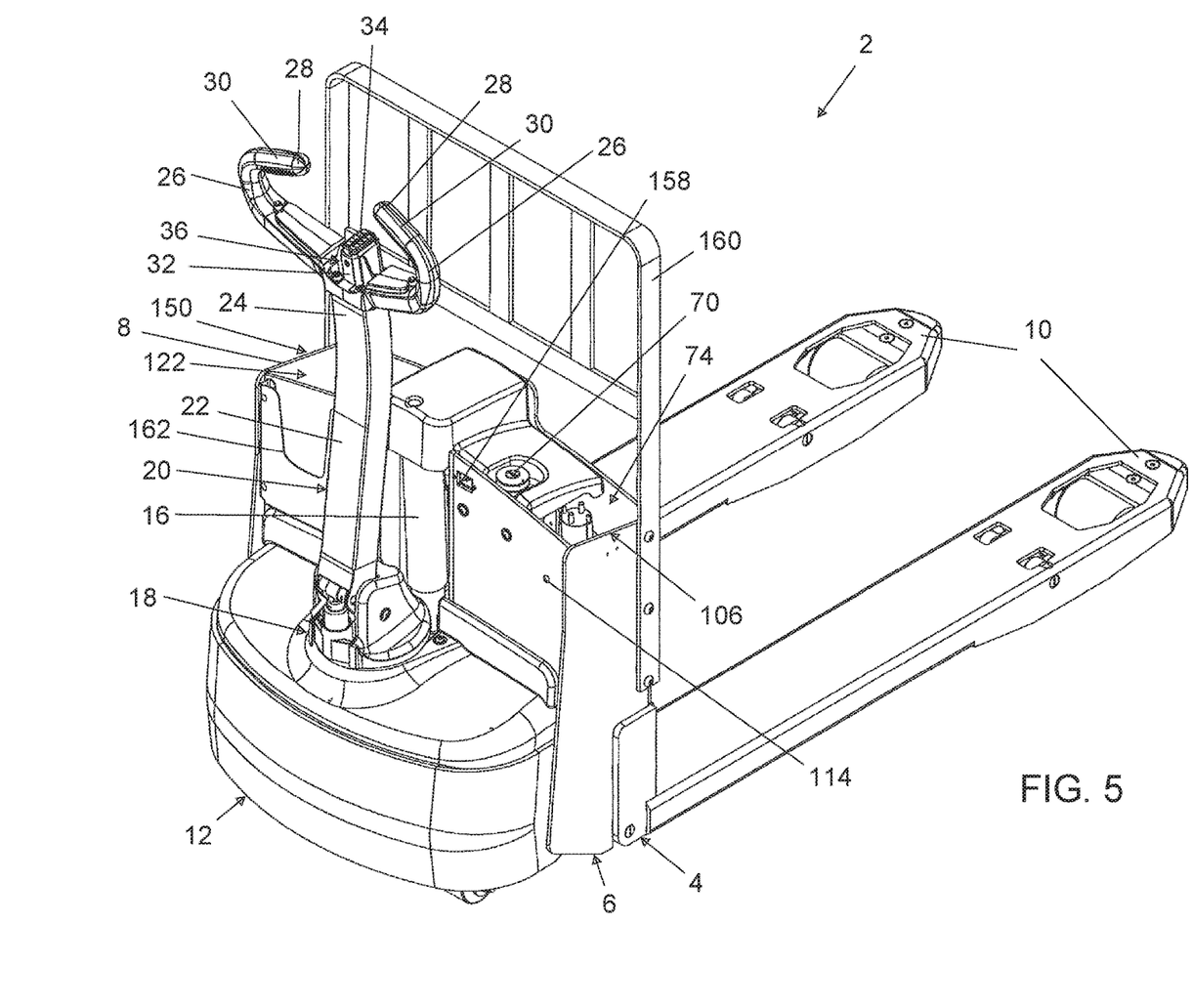
FIG. 5 is a right upper rear perspective view of the vehicle shown in FIG. 1, but with the tiller head, controller and battery plug-in modules removed.
Figure 6:
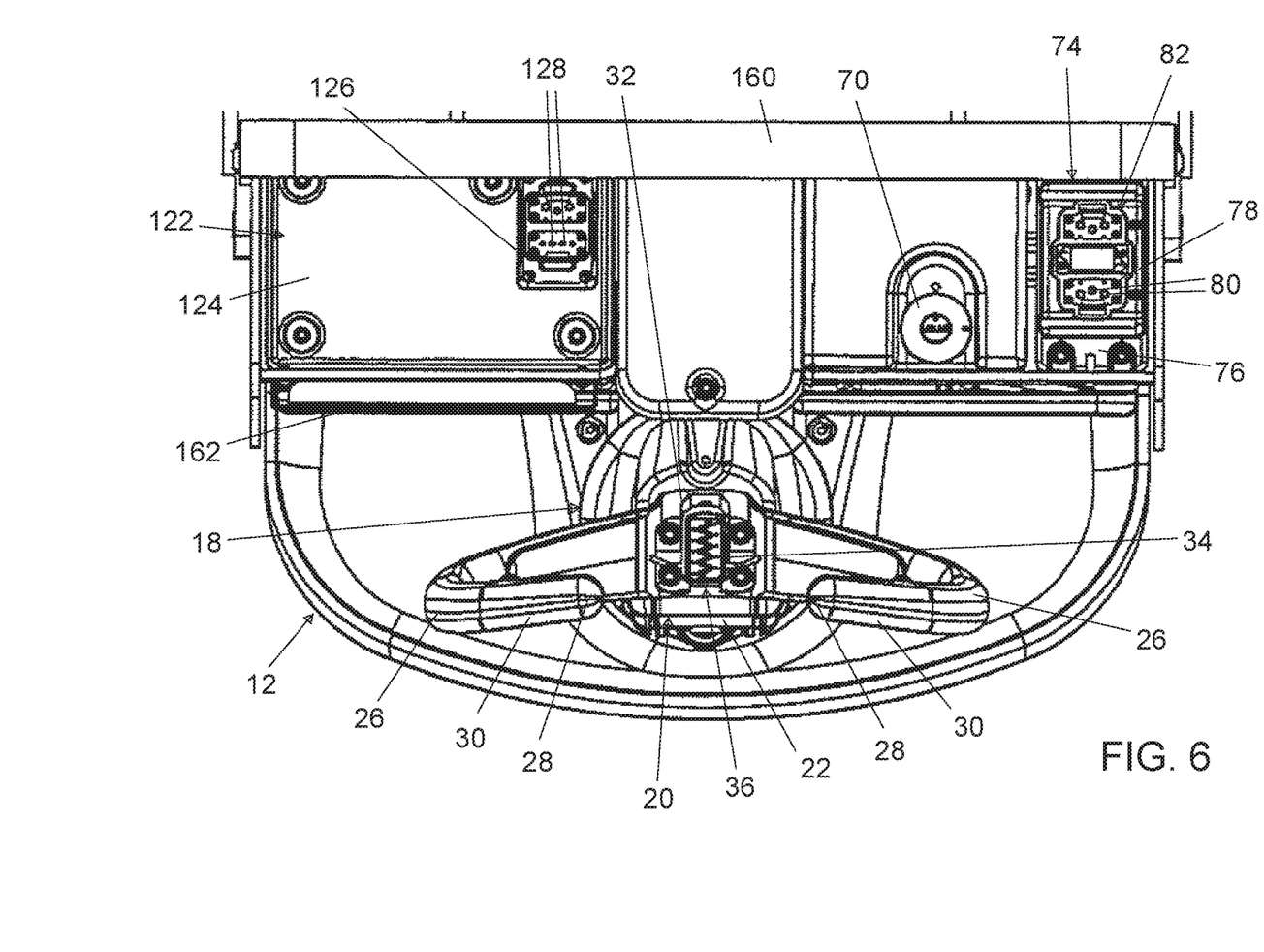
FIG. 6 is a top plan view of the load lift portion of the vehicle shown in FIG. 5, with the tiller head, controller and battery plug-in modules removed.
Figure 7:
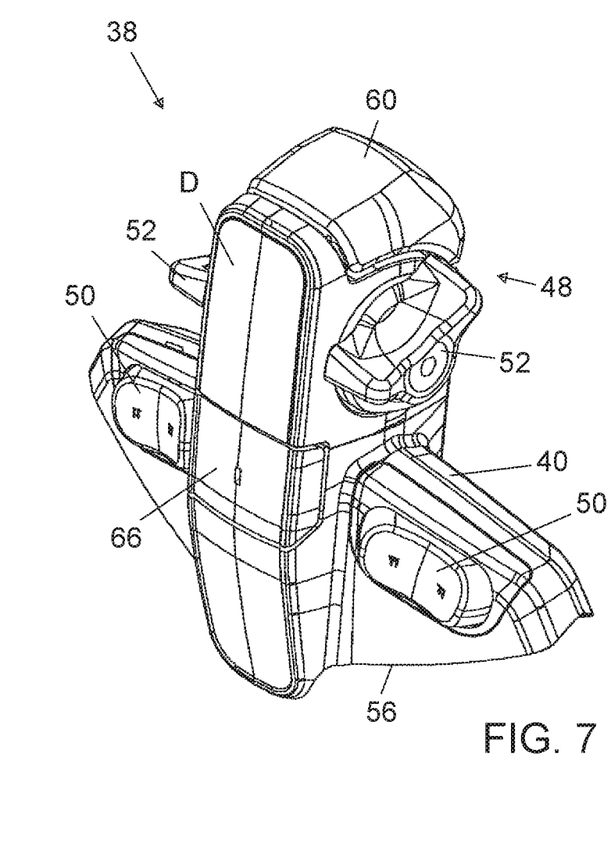
FIG. 7 is a left upper front perspective view of the tiller head plug-in module removed from the vehicle shown in FIG. 1 and in an upright position.
Figure 8:
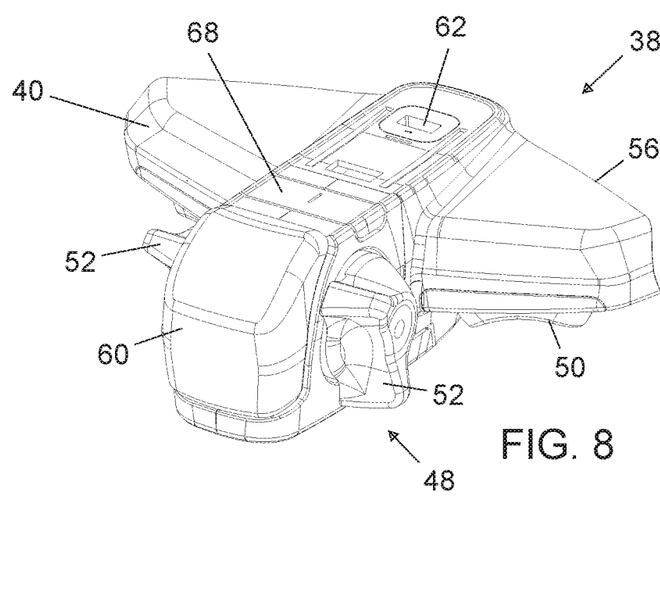
FIG. 8 is a left upper rear perspective view of the tiller head plug-in module shown in FIG. 7 and in a downward facing position.

The example material handling vehicle 2 also includes a controller plug-in module 72. As best seen in FIGS. 5-6, the upstanding body portion 8 of the body 6 of the vehicle 2 includes an upwardly open compartment 74 having a bottom 76, with the bottom 76 of the compartment 74 having an upward extending wall 78 surrounding electrical contacts 80 associated with controller functions of the vehicle 2. This structure forms an upward extending vehicle controller connector 82 to be received by the controller plug-in module 72.

The controller plug-in module 72 includes a housing 84 having an upper portion 86, a lower portion 88 and a side wall 90 extending between the upper portion 86 and lower portion 88. The side wall 90 of the housing 84 is configured to be received by the upwardly open compartment 74 of the vehicle body 6. The housing lower portion 88 further includes an upward extending wall 92 defining a recess 94 in the lower portion 88 of the housing 84 and surrounding electrical contacts 96. This structure forms an upward extending controller plug-in module connector 98 that receives the mating vehicle controller connector 82. The controller plug-in module 72 is configured to be removably electrically connected to the vehicle 2 when the upward extending wall 78 surrounding the electrical contacts 80 of the upwardly open compartment 74 of the upstanding body portion 8 is plugged into and received by the recess 94 in the lower portion 88 of the housing 84 of the controller plug-in module 72 having the upward extending wall 92 surrounding the electrical contacts 96 of the controller plug-in module 72.

Figure 1:
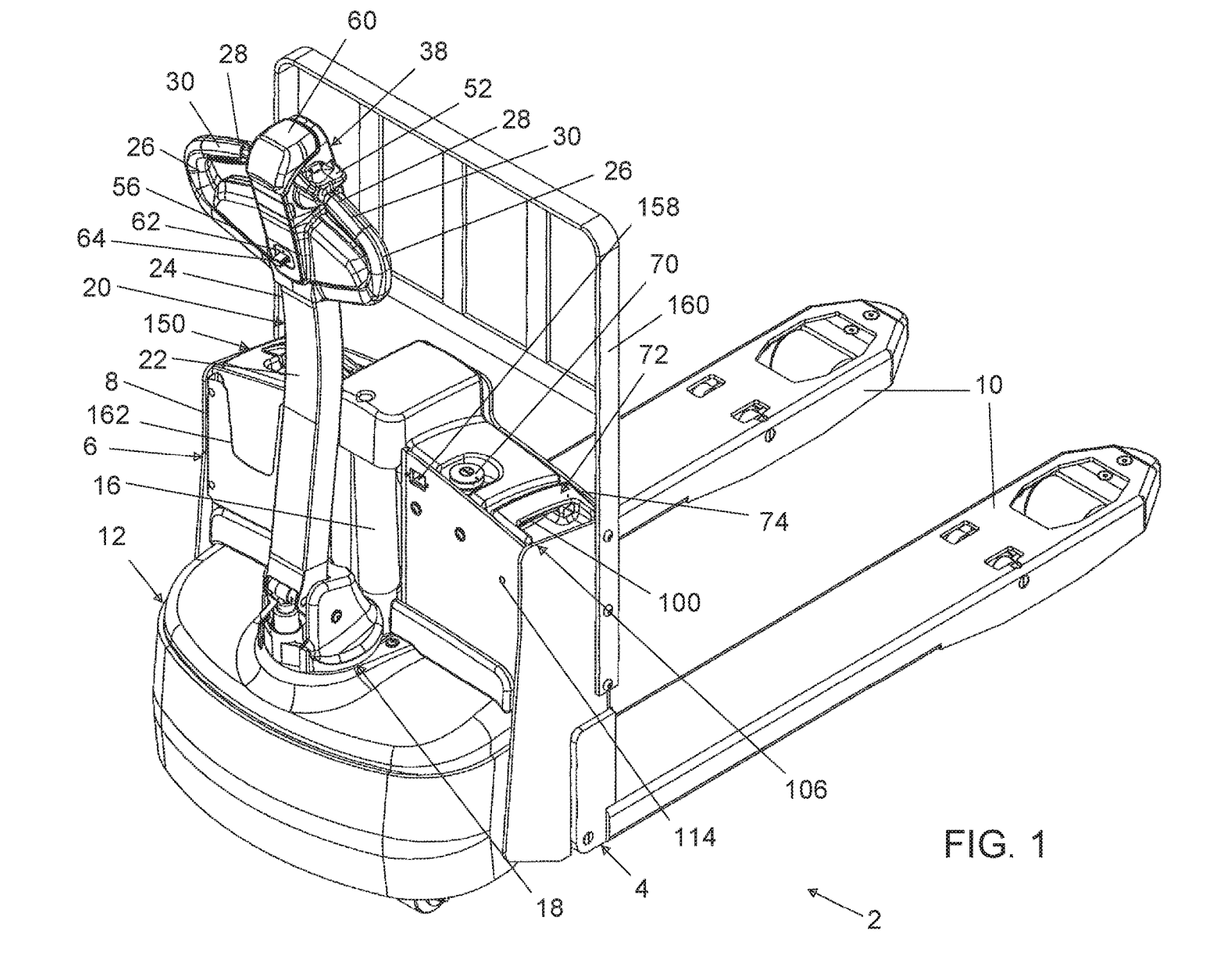
FIG. 1 is a right upper rear perspective view of a material handling vehicle in the form of a pallet truck having quickly removable tiller head, controller and battery plug-in modules installed for use of the vehicle.

The upper portion 86 of the controller plug-in module 72 may include at least one handle portion 100. As best seen in FIG. 1, the at least one handle portion 100 of the controller plug-in module 72 is accessible when the vehicle 2 is configured for operation, such as when all of the tiller head, controller and battery plug-in modules are installed. The controller plug-in module 72 also is removable without tools by lifting the controller plug-in module 72 from the upwardly open compartment 74 by the at least one handle portion 100. The example at least one handle portion 100 shown includes a recess 102, which may receive a user's finger tips when gripping and removing or reinserting the controller plug-in module 72. The handle portion may be of any suitable configuration for gripping, but in the present example, the at least one handle portion 100 further includes a grip portion 104 that spans the recess 102.

Proper installation of the controller plug-in module 72 may be readily appreciated visually. The vehicle body 6 includes an upper contour portion 106 at the top of the upwardly open compartment 74 and the upper portion 86 of the controller plug-in module 72 has a complementary upper contour 108 that follows the upper contour portion 106 of the vehicle body 6 at the upwardly open compartment 74. In addition, the controller plug-in module 72 has an asymmetrical cross-sectional shape, as may be appreciated in viewing FIG. 20, and the upwardly open compartment 74 of the vehicle body 6 has an asymmetrical cross-sectional shape that is complementary to and receives the controller plug-in module 72, as may be appreciated in viewing FIG. 1.

The controller plug-in module 72 of the present example also includes two further optional advantageous features. First, the housing 84 of the controller plug-in module 72 includes a port 110 configured to receive a plug of a cord (not shown) for use in diagnostic analysis of the function or performance of the controller plug-in module 72. Second, the side wall 90 of the controller plug-in module 72 may include a locating depression or channel 112, which is configured to be aligned with an aperture 114 through the upstanding body portion 8 that forms the upwardly open compartment 74 of the vehicle body 6. The aperture 114 and locating depression 112 may advantageously help to ensure the controller plug-in module connector 98 remains in full engagement with the vehicle controller connector 82 when the vehicle 2 encounters rough surfaces or vibration.

It will be appreciated that the example material handling vehicle 2 also is shown with a battery plug-in module 120, best seen in FIGS. 12-15. Indeed, the upstanding body portion 8 of the vehicle body 6 includes a second upwardly open compartment 122, best seen in FIG. 5, having a bottom 124, best seen in FIG. 6, with the bottom 124 of the second upwardly open compartment 122 including an upward extending wall 126 surrounding electrical contacts 128 associated with transmitting battery power.

Figure 15:
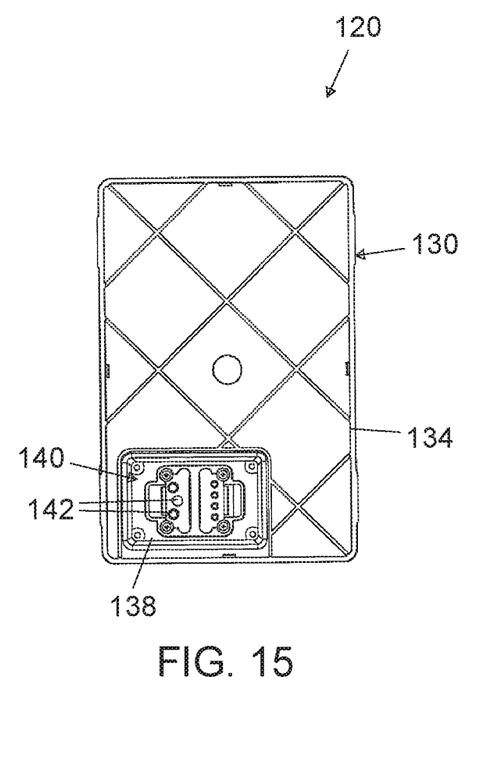
FIG. 15 is a bottom plan view of the battery plug-in module shown in FIG. 1.
Figure 16:
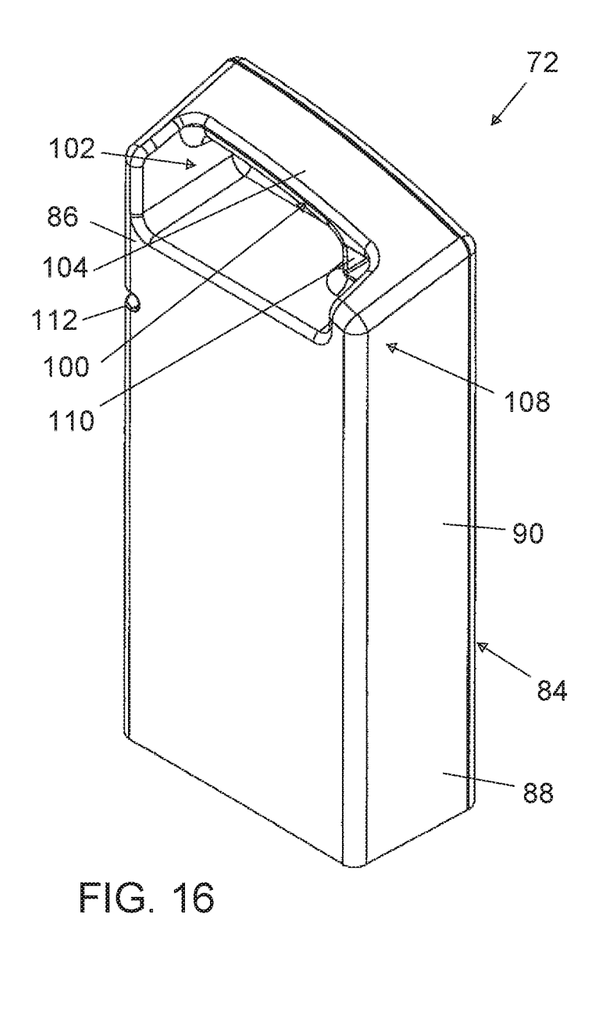
FIG. 16 is a right upper front perspective view of the controller plug-in module shown in FIG. 1.
Figure 17:
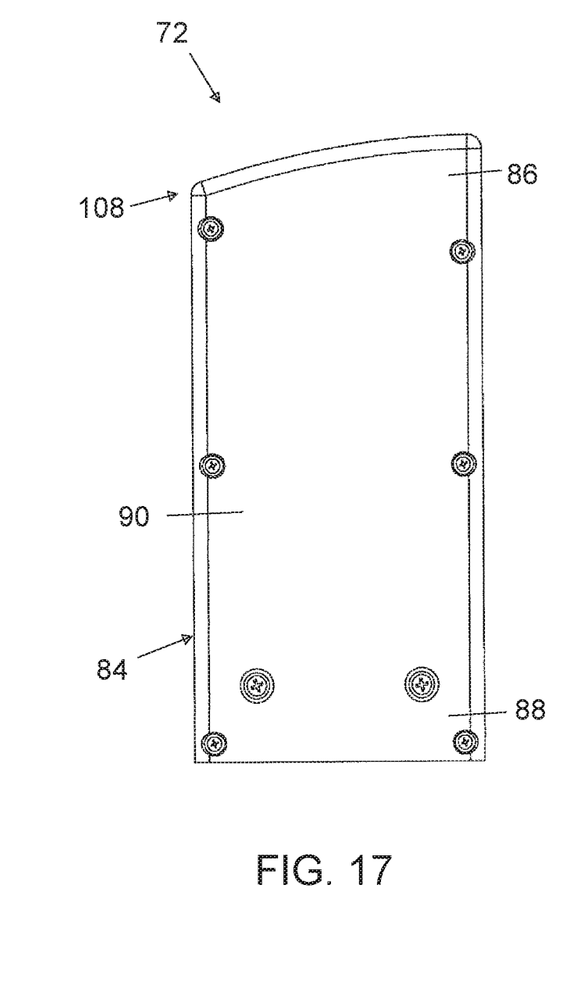
FIG. 17 is a left side plan view of the controller plug-in module shown in FIG. 16.
Figure 18:
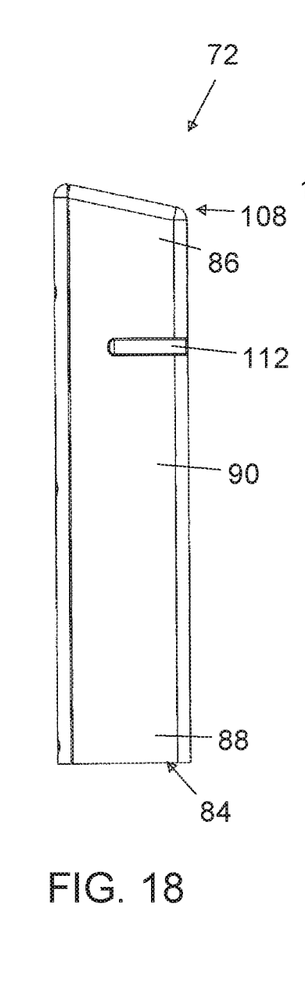
FIG. 18 is a rear plan view of the controller plug-in module shown in FIG. 16.
Figure 19:
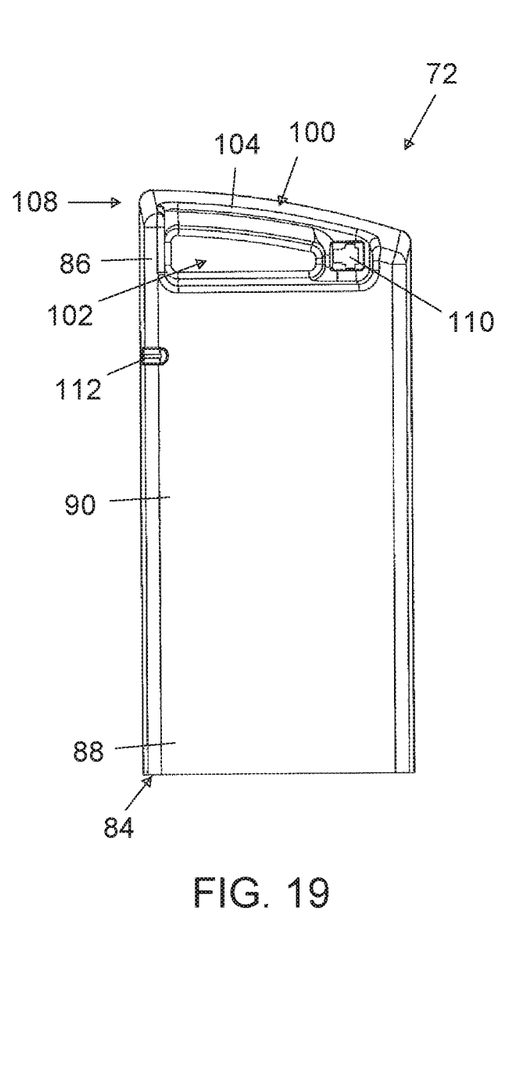
FIG. 19 is a right side plan view of the controller plug-in module shown in FIG. 16.
Figure 20:
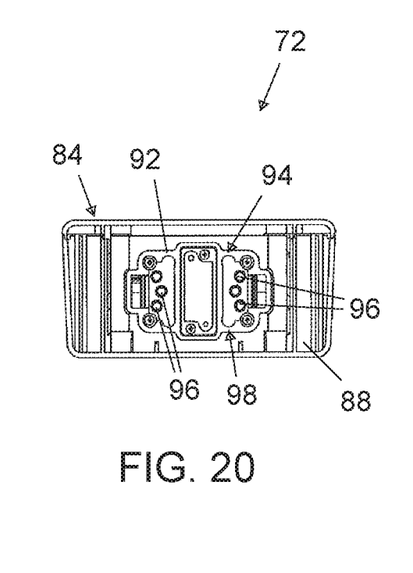
FIG. 20 is a bottom plan view of the controller plug-in module shown in FIG. 16.

As seen in FIGS. 12-15, the battery plug-in module 120 includes a housing 130 having an upper portion 132, a lower portion 134 and a side wall 136 extending between the upper portion 132 and lower portion 134 of the battery plug-in module 120. The side wall 136 of the housing 130 of the battery plug-in module 120 is configured to be received by the second upwardly open compartment 122 of the vehicle body 6. As best seen in FIG. 15, the lower portion 134 of the housing 130 of the battery plug-in module 120 has an upward extending wall 138 defining a recess 140 and surrounding electrical contacts 142. The battery plug-in module 120 is configured to be removably electrically connected to the vehicle 2 when the upward extending wall 126 surrounding the electrical contacts 128 of the second upwardly open compartment 122 of the upstanding body portion 8, as seen in FIG. 6, is plugged into and received by the recess 140 in the lower portion 134 of the housing 130 of the battery plug-in module 120 having the upward extending wall 138 surrounding the electrical contacts 142 of the battery plug-in module 120, as seen in FIG. 15.

Figure 2:
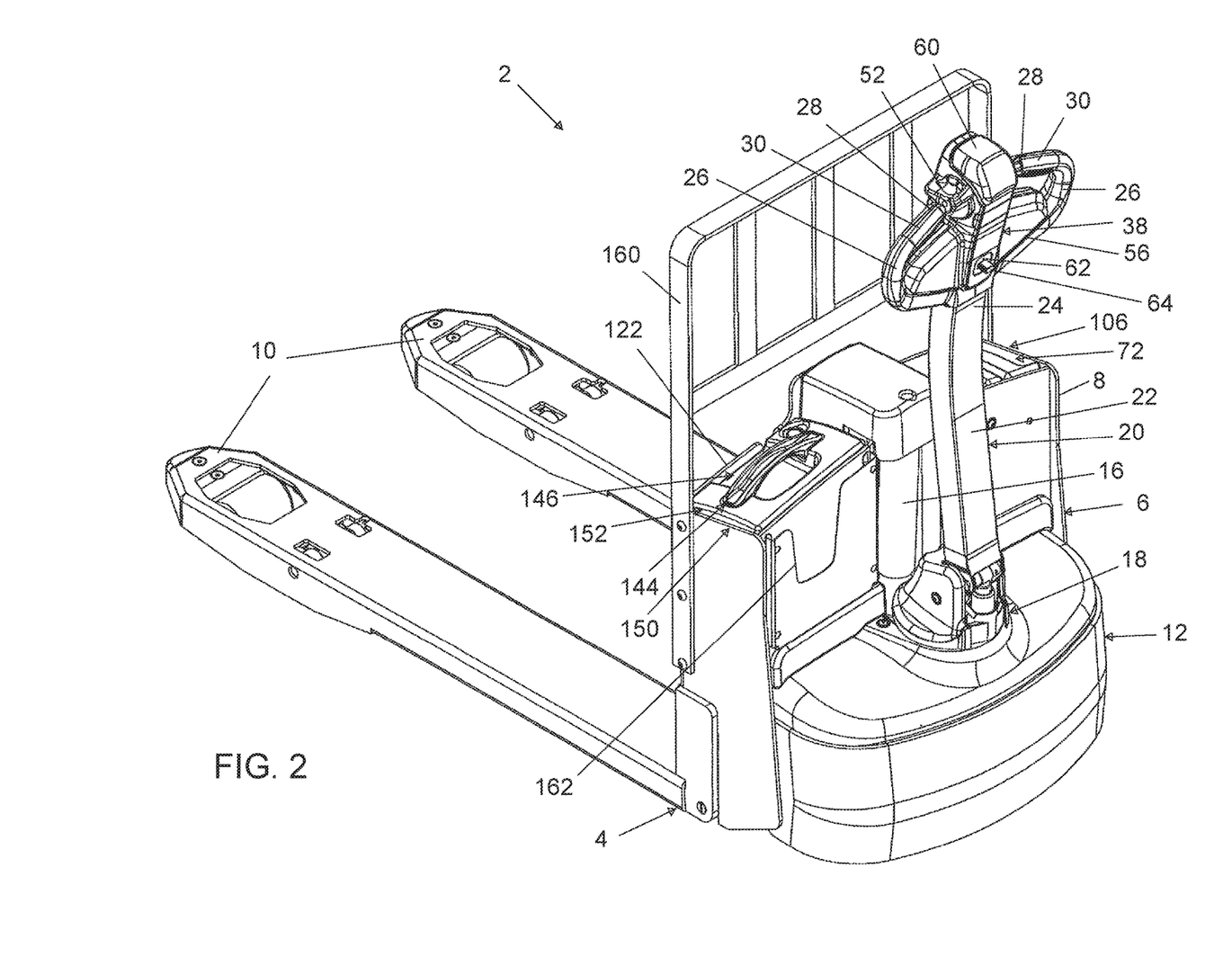
FIG. 2 is a left upper rear perspective view of the vehicle shown in FIG. 1.

The upper portion 132 of the battery plug-in module 120 may include at least one handle portion 144. As best seen in FIG. 2, the at least one handle portion 144 of the battery plug-in module 120 is accessible when the vehicle 2 is configured for operation, such as when all of the tiller head, controller and battery plug-in modules are installed. The battery plug-in module 120 also is removable without tools by lifting the battery plug-in module 120 from the second upwardly open compartment 122 by the at least one handle portion 144. The example at least one handle portion 144 shown includes a recess 146, which may receive a user's finger tips when gripping and removing or reinserting the battery plug-in module 120. The handle portion may be of any suitable configuration for gripping, but in the present example, the at least one handle portion 144 of the battery plug-in module 120 further includes a grip portion 148 that spans the recess 146.

Proper installation of the battery plug-in module 120 may be readily appreciated visually. The vehicle body 6 includes an upper contour portion 150 at a top of the second upwardly open compartment 122 and the upper portion 132 of the battery plug-in module 120 has a complementary upper contour 152 that follows the upper contour portion 150 of the vehicle body 6 at the second upwardly open compartment 122. In addition, the upward extending wall 138 defining the recess 140 in the housing 130 of the battery plug-in module 120 is located asymmetrically within the lower portion 134 of the housing 130 of the battery plug-in module 120, as may be appreciated in FIGS. 6 and 15.

Figure 3:
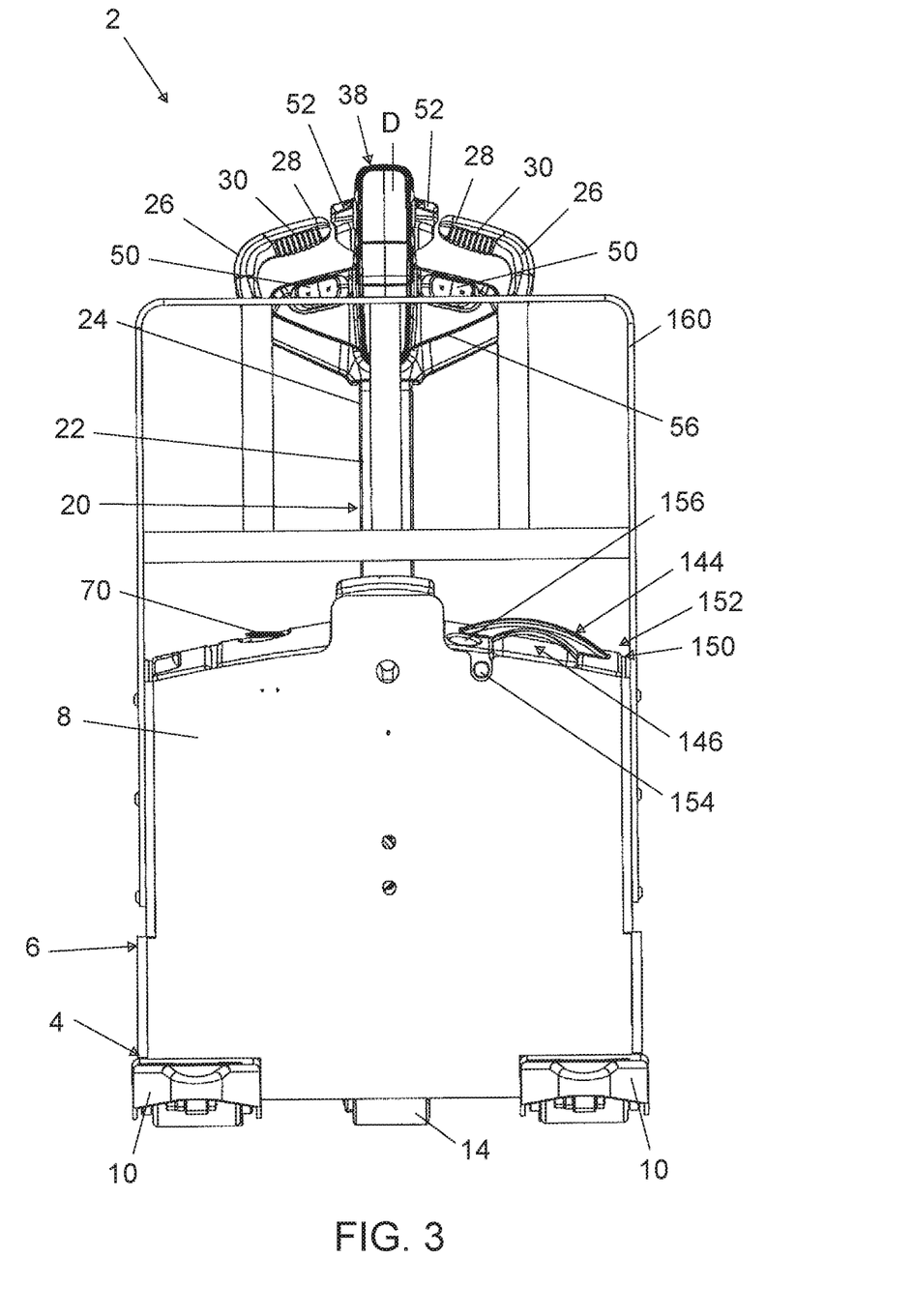
FIG. 3 is a front plan view of the vehicle shown in FIG. 1.
Figure 4:
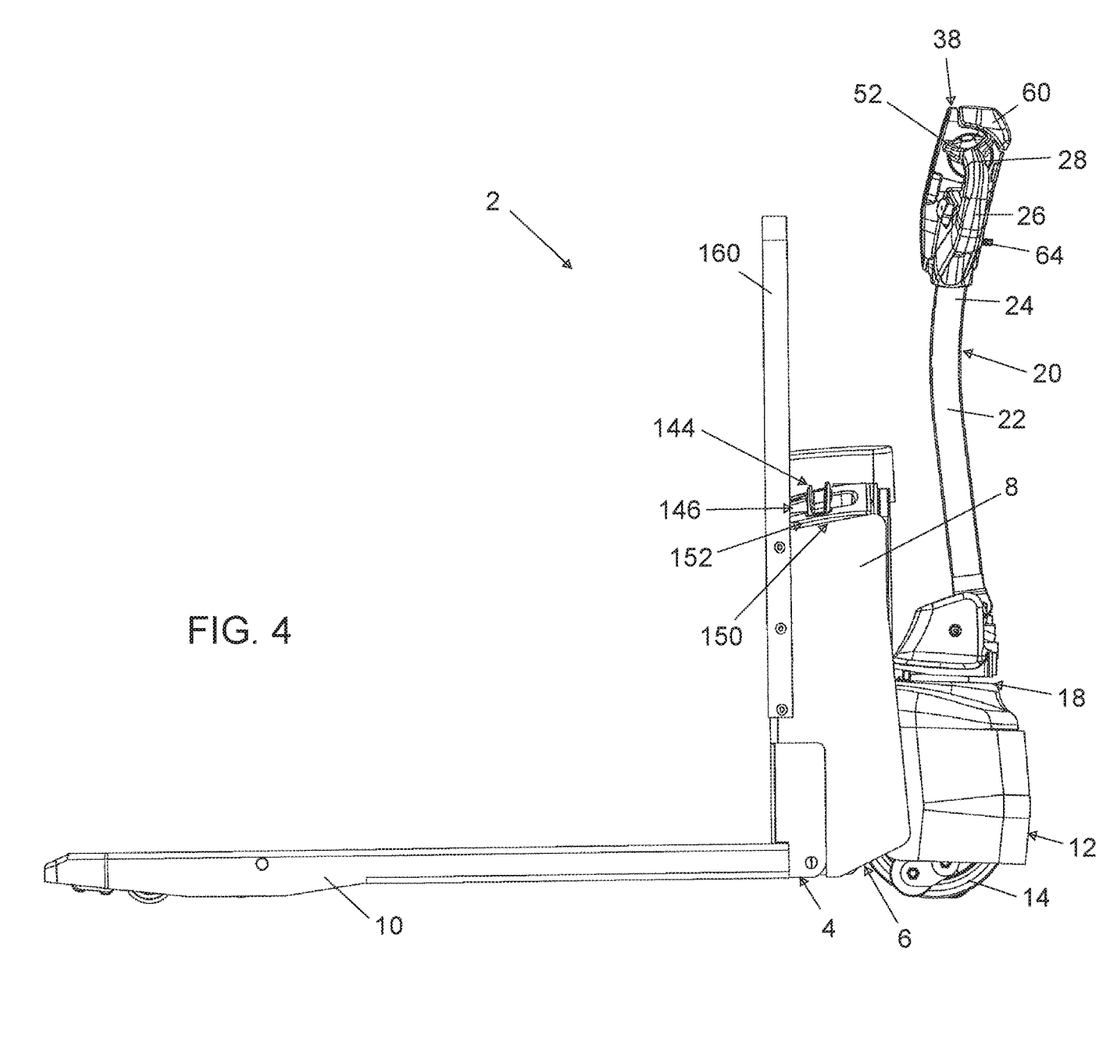
FIG. 4 is a left side plan view of the vehicle shown in FIG. 1.
Figure 12:
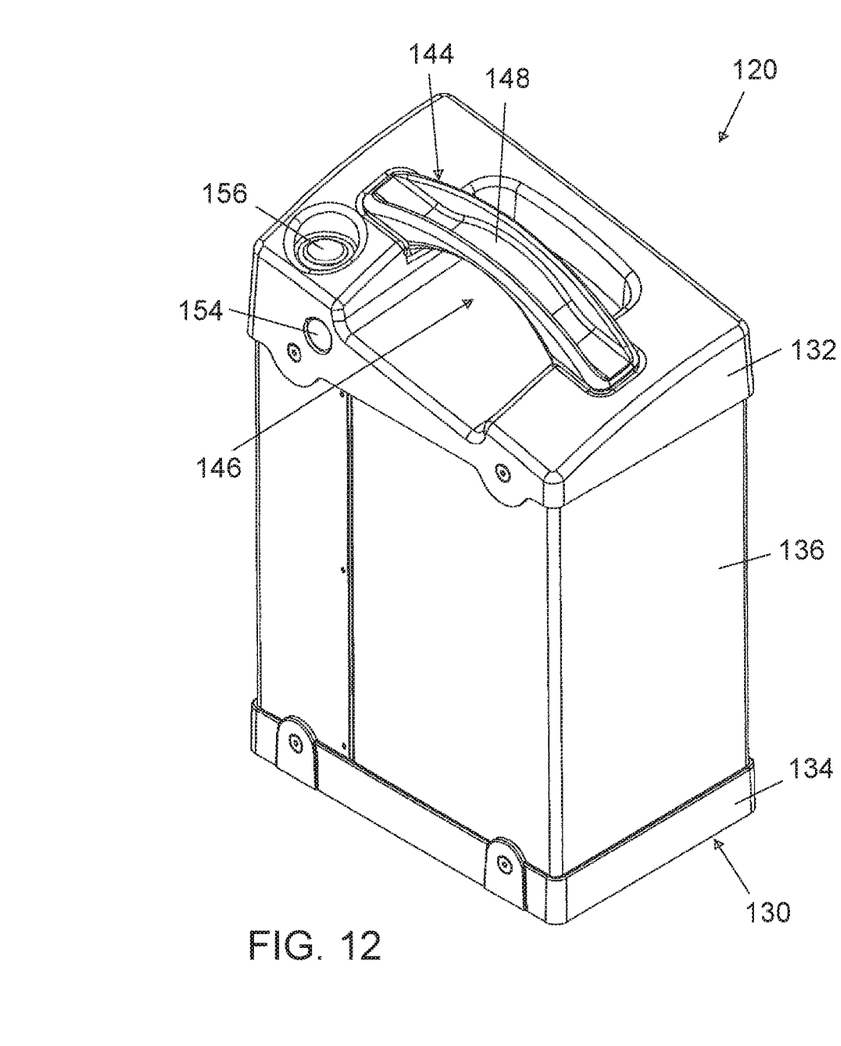
FIG. 12 is a left upper front perspective view of the battery plug-in module shown in FIG. 1.
Figure 13:
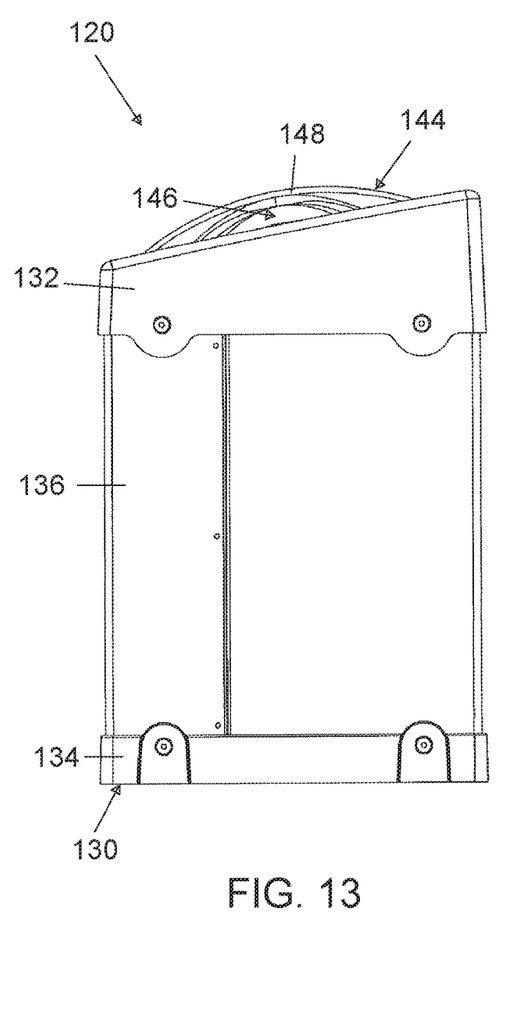
FIG. 13 is a rear plan view of the battery plug-in module shown in FIG. 12.
Figure 14:
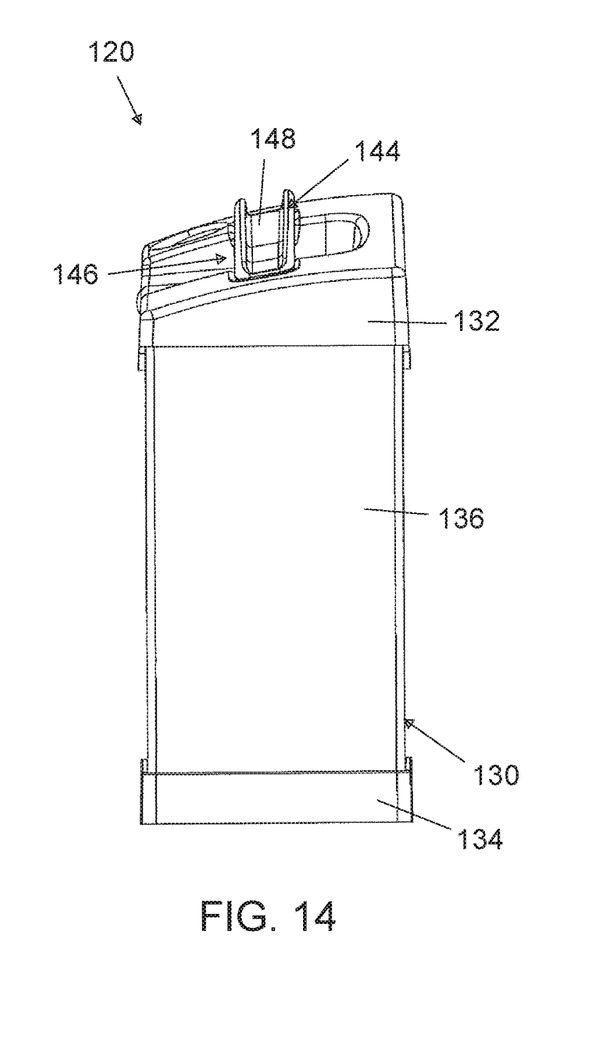
FIG. 14 is a left side plan view of the battery plug-in module shown in FIG. 12.

The battery plug-in module 120 of this example also includes a further built-in safety feature in the form of a forward headlight 154, best seen in FIGS. 3 and 12. As configured in the present example, the headlight 154 provides forward light if a switch 156 on the upper portion 132 of the battery plug-in module 120 is operated. For example, the switch 156 may include an on/off button that is operated when depressed to turn on and turn off the headlight 154.

For convenience, the battery plug-in module 120 also may be recharged while received in the second upwardly open compartment 122 of vehicle 2 by use of an on-board battery charger, when a plug of a power cord (not shown) is installed in the port 158 in the rear of the upstanding body portion 8, as seen in FIGS. 1 and 5. Additional conveniences optionally may be provided with the example vehicle 2. For instance, a backrest or rear rack 160 that assists in keeping a tall load from potentially shifting rearward and extending over the vehicle body 6 may be used. A display D may be located on the upper front face of the tiller head plug-in module 38 to provide information regarding the status of the vehicle 2. Also, a slot 162 may be provided to store papers or other materials, such as an operator's manual, close at hand on the rear of the upstanding body portion 8, as seen in FIGS. 1-2 and 5-6.

Thus, the present disclosure presents alternatives to prior art more permanently mounted and hard-wired tiller head, controller and battery systems for material handling vehicles. The new tiller head, controller and battery plug-in modules provide advantageous features by permitting quick and convenient removal and replacement in the field, without having to take a vehicle out of service. The plug-in modules will significantly improve productivity of the personnel and equipment by permitting increased vehicle utilization.

It will be appreciated that the present disclosure shows and demonstrates a preferred example tiller head, controller and battery plug-in modules for material handling vehicles, which are discussed in the context of an example electric powered pallet truck. Indeed, this example is merely illustrative and is not to be considered limiting. It will be apparent to those of ordinary skill in the art that the tiller head, controller and battery plug-in modules may be constructed and configured for use individually or in various combinations, and with various material handling vehicles, without departing from the scope or spirit of the present disclosure. Thus, although an example has been described herein for use in a pallet truck, the scope of coverage of this patent is not limited thereto. On the contrary, this patent covers all methods, apparatus and articles of manufacture fairly falling within the scope of the appended claims either literally or under the doctrine of equivalents.

The invention claimed is:

1. A handle and tiller head plug-in module for a material handling vehicle, comprising:
    a handle further comprising:
        an elongated tiller having an upper portion;
        the upper portion including at least one steering handgrip member and an upward extending wall surrounding electrical contacts associated with operator control functions;
    a tiller head plug-in module further comprising:
        a housing;
        the housing having a downward extending wall surrounding electrical contacts;
        the housing supporting a plurality of operator control interface elements, including at least one lift control element, and at least drive control element;
    the tiller head plug-in module configured to be removably electrically connected to the handle when the upward extending wall surrounding the electrical contacts of the upper portion of the tiller is plugged into and received by the downward extending wall surrounding the electrical contacts of the housing.

2. The handle and tiller head plug-in module of claim 1, wherein the at least one lift control element extends forward from the housing.

3. The handle and tiller head plug-in module of claim 1, wherein the at least one lift control element further comprises a rocker switch or toggle switch.

4. The handle and tiller head plug-in module of claim 1, wherein the at least one lift control element further comprises a plurality of lift control elements.

5. The handle and tiller head plug-in module of claim 4, wherein the plurality of lift control elements further comprise a plurality of lift and lower control elements.

6. The handle and tiller head plug-in module of claim 1, wherein the at least one drive control element extends from a side of the housing.

7. The handle and tiller head plug-in module of claim 1, wherein the at least one drive control element controls forward drive.

8. The handle and tiller head plug-in module of claim 1, wherein the at least one drive control element controls rearward drive.

9. The handle and tiller head plug-in module of claim 1, wherein the at least one drive control element is pivotable in a forward direction to control forward drive and is pivotable in a rearward direction to control rearward drive.

10. The handle and tiller head plug-in module of claim 1, wherein the at least one drive control element further comprises a plurality of drive control elements.

11. The handle and tiller head plug-in module of claim 1, wherein the plurality of operator control interface elements further comprises at least one auto-direction reversing control element.

12. The handle and tiller head plug-in module of claim 1, wherein the housing has an open bottom having a perimeter and further comprises a downward extending wall at the perimeter of the open bottom.

13. The handle and tiller head plug-in module of claim 12, wherein the downward extending wall surrounding the electrical contacts of the housing is disposed within the open bottom of the housing.

14. The handle and tiller head plug-in module of claim 12, wherein the downward extending wall at the perimeter of the open bottom receives a portion of the at least one steering handgrip member when the upward extending wall surrounding the electrical contacts of the upper portion of the tiller is plugged into and received by the downward extending wall surrounding the electrical contacts of the housing.

15. The handle and tiller head plug-in module of claim 14, wherein the housing further comprises apertures that receive fasteners, wherein the fasteners pass through the apertures in the housing and connect the housing to the tiller.

16. The handle and tiller head plug-in module of claim 1, wherein the plurality of operator control interface elements further comprises an operator key port.

* * * * *